Patented Dec. 6, 1927.

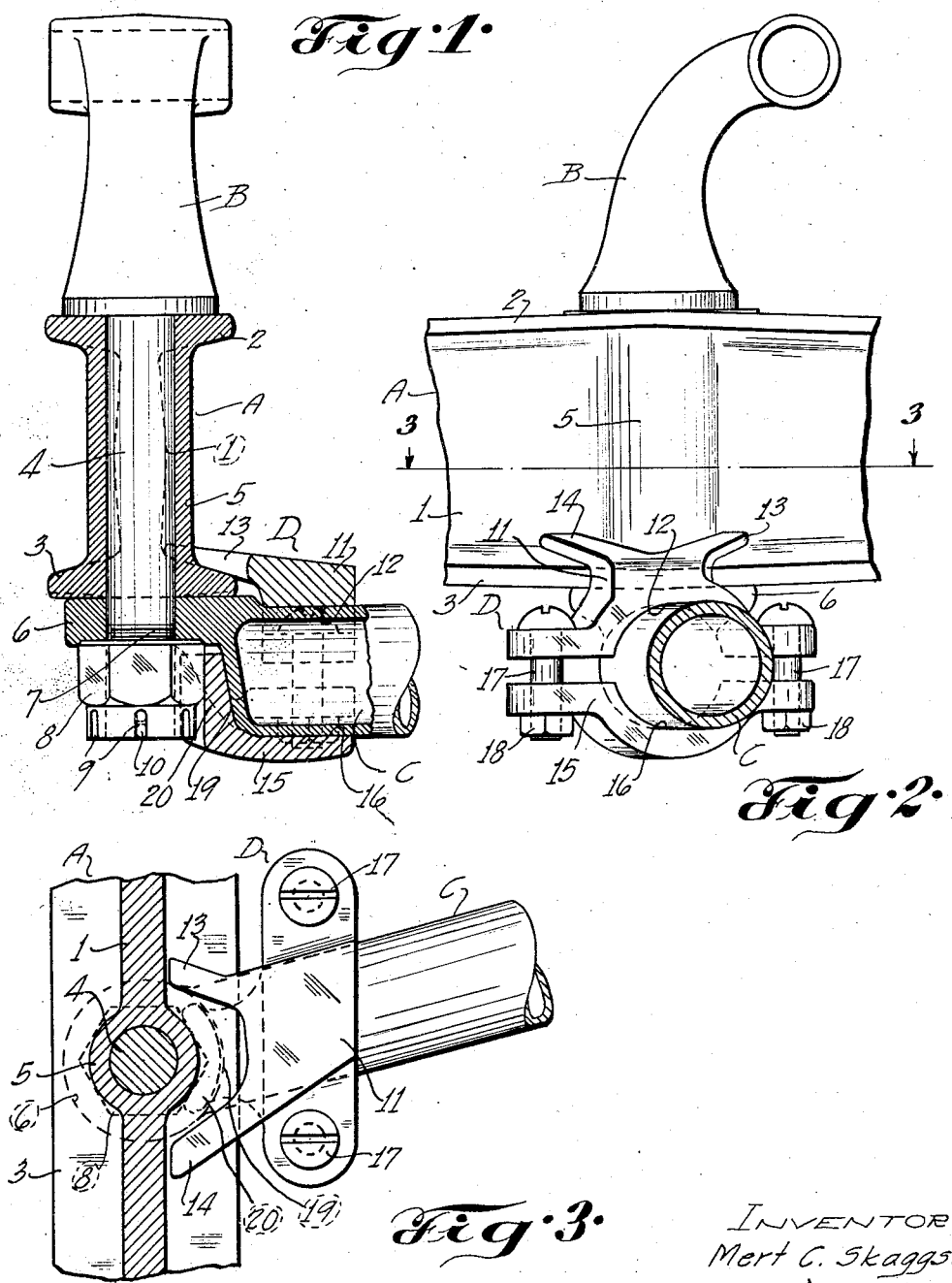

1,651,559

UNITED STATES PATENT OFFICE.

MERT C. SKAGGS, OF CROCKER, MISSOURI, ASSIGNOR OF ONE-HALF TO CYRUS MAL-
LETTE, OF CROCKER, MISSOURI.

COMBINATION BRACE AND NUT LOCK FOR AUTOMOBILES AND THE LIKE.

Application filed April 15, 1926. Serial No. 102,362.

This invention relates generally to automobiles and, more particularly, to a certain new and useful improvement in combination braces and locks for the radius-rods and perch securing-nuts of automobiles of the Ford type.

My present invention has for its chief object the provision of means preferably in the form of a relatively simple, inexpensive, and conveniently installed device, especially adapted for use in connection with automobiles of the type named, for efficiently supporting and bracing the radius rods thereof adjacent the car front axle and, at the same time, locking against removal or displacement the spring-perch and radius-rod securing or retaining nuts.

And with the above and other objects in view, my invention resides in the novel features of form, construction, arrangement, and combination of parts hereinafter described and pointed out in the claims.

In the accompanying drawing,

Figure 1 is a vertical sectional view through the car front axle adjacent one end thereof, illustrating a combination brace and nut-lock of my invention, shown in longitudinal section, in connection with the axle assembly of one of the spring-suspension brackets or perches and one of the radius-rods;

Figure 2 is an elevational view of the parts illustrated in Figure 1; and

Figure 3 is a sectional view taken approximately on the line 3—3, Figure 2, looking in the direction of the arrows.

Referring now more in detail and by reference characters to the drawing, which illustrates a preferred embodiment of my invention, A designates the car front axle, which is of the usual I-beam section, comprising a central web 1 and top and bottom flanges 2 and 3, respectively.

Seated on the top-flange 2 of the axle A and including a shank 4 projecting downwardly through a bored axle-portion 5 provided for the purpose, is a standard spring-suspension bracket or so-called perch B.

The perch-shank 4 is of a length to extend somewhat below the lower axle-flange 3, and fitting on such end of said shank 4 and abutting against the lower axle-flange 3, is an offset flattened apertured end-extension 6 of a rearwardly and angularly or obliquely presented radius-rod C.

At its lower end, the perch-shank 4 is threaded, as at 7, to receive a nut 8 preferably provided with transverse slots 9 for accommodating the usual cotter-pin 10 that is passed through an aligning transverse bore in the shank 4 for normally securing the nut 8 against displacement, the nut 8 serving the dual function of normally retaining both the spring-perch B and the radius-rod C in their jointly connected and assembled relation with the axle A.

The automobile parts and the co-operative relation thereof which I have described are of standard form and construction, and it has been found by actual experience that, owing to the severe strains and jolts to which an automobile is subjected in use, not only do the radius-rods C very frequently become bent or twisted adjacent the axle A and thereby interfere with proper running manipulation of the car, but that also the nuts 7, notwithstanding the cotter-pins 10, frequently work loose, with a resulting and corresponding looseness in the spring-suspension brackets B and the radius rods C, which is not only annoying by the rattle of the parts, but dangerous on account of the liability of breakage at the connection, more or less severe accidents often resulting.

To overcome and obviate such faults, my present invention contemplates the application of a supplemental reinforcement D in the form of a combined brace for the radius-rod C and lock for the nut 8. This reinforcement D comprises a yoke-member 11 adapted to seat on the rod C adjacent the axle A and for such purpose is formed intermediate its ends with a recess 12, which is substantially semi-circular in section and both of corresponding diametrical dimension and transversely of yoke 11 of corresponding angularity to snugly accommodate the rod C adjacent the flattened end-portion 6 thereof, as best seen in Figures 1 and 2. Projecting angularly and forwardly from yoke 11, are fork-extensions 13, 14 of relatively unequal length adapted to rest upon and supportingly engage with the upper face of lower axle-flange 3 in straddling relation to the bored axle-portion 5, as best seen in Figure 3. Complementing the yoke 11, is a second or clamping yoke-member 15 having a counterpart rod-accommodating recess or seat 16 and adapted to fit snugly upon the rod C under and in opposed relation to the yoke 11. Engaging the opposed ends of the yokes 11 and 15, are bolts 17, 17 having retaining nuts 18, 18, for securely fastening the yokes 11 and 15 in radius-rod engaging relation.

The radius-rod C is, as is usual, tubular in form, and in the formation of its offset flattened apertured end-portion 6, the radius-rod C is provided with a front end face 19. Forming preferably an integral part or extension of the under rod-engaging yoke 15, is a forwardly and upwardly presented lug 20, which, when the yokes 11 and 15 are in clamped radius-rod engaging relation, is adapted to fit snugly between and engage the perch-nut 8 and the said front end-face 19 of the radius-rod C, the lug 20 having an arcuate rear face and its front face being in the form of an annular seat or V-shaped recess, as best seen in Figure 3, for wedge-like engaging with one of the corners and two contiguous flat faces of the nut 8.

It will thus be evident that, when the opposed yokes 11 and 15 are in clamped radius-rod engaging relation with the lug 20 interposed between the nut 8 and the front end-face 19 of the radius-rod C, not only is a reinforcing support or brace afforded for the radius-rod C adjacent the axle A and at the point subjected to greatest strains and where the usual heretofore twisting or bending has occurred, but also that the nut 8 is most securely held and retained in perch and radius-rod securing engagement with the perch-shank 4—so securely even that the usual cotter-pin 10 may be wholly dispensed with.

My new device is exceedingly simple in form and construction, may be inexpensively manufactured, may be conveniently installed upon the automobile, and has been found exceedingly efficient in the performance of its intended functions.

I am aware that changes in the form, construction, arrangement, and combination of the several parts of my new device may be made and substituted for those herein shown and described without departing from the nature and principle of my invention.

Having thus described my invention, what I claim and desire to secure by Letters Patent is:

1. An automobile combined radius-rod brace and perch-nut lock including, in combination, a pair of complementing yoke-members angularly recessed to seat in opposed relation upon opposite sides of the radius rod, an extension upon one of said yoke-members adapted for supporting engagement upon a flange of the axle, a lug having a V-shaped front recess carried by the other of said yoke-members adapted for nut-locking interposition between the perch-nut and the front end of the radius-rod, and means engaging the yoke-members for rigidly securing the same together and upon the radius rod.

2. In combination with the axle, spring-perch shank, radius-rod, and perch and radius-rod securing nut of an automobile, of a combined brace and lock for said rod and nut, the same including a pair of complementing yoke-members adapted to seat in opposed relation upon the radius-rod, a forked-extension upon one of said yoke-members adapted for supporting engagement upon the axle in straddling relation with said shank, a lug having a V-shaped front recess carried by the other yoke-member adapted to snugly fit in nut-engaging relation between said nut and the front-end of the radius-rod, and means engaging the yoke-members for securing the same in cooperative relation upon the radius-rod.

In testimony whereof, I have signed my name to this specification.

MERT C. SKAGGS.